March 7, 1939.   G. G. LANDIS ET AL   2,150,071
DYNAMO-ELECTRIC MACHINE CONTROL
Filed June 21, 1934

INVENTORS.
George G. Landis and
BY Norman J. Hoenie.
Fay, Oberlin & Fay
ATTORNEYS Patented Mar. 7, 1939

2,150,071

UNITED STATES PATENT OFFICE 2,150,071

DYNAMO-ELECTRIC MACHINE CONTROL

George G. Landis and Norman J. Hoenie, Cleveland, Ohio, assignors to The Lincoln Electric Company, Cleveland, Ohio, a corporation of Ohio Application June 21, 1934, Serial No. 731,783

5 Claims. (Cl. 219—8)

This invention relates as indicated to control means for dynamo-electric machines, particularly welding current generators.

It is an object of our invention to provide a control device for welding current generators, or more particularly welding current systems whereby the operator may vary or control the operating characteristics, or more particularly, the volt-ampere output characteristics of the welding current generator from the welding station.

It is a further object of our invention to provide a control system of the character described whereby the operator may effect the desired control over the welding current generator from the welding station without the necessity of carrying any leads other than the usual welding leads to such station.

It is a further object of our invention to provide a control system of the character described which, while the same is responsive to certain manipulations by the operator at the welding station, there is, however, no interference with the usual welding operation, nor is the setting of the welding current generator in any way changed by such changes in the characteristics of the welding circuit as occur during normal welding operation.

It is a further and more particular object of our invention to provide a control system whereby the volt-ampere output characteristics of the generator may be controlled or varied in opposite senses responsive to volt-ampere characteristics of the welding circuit under the control of the operator at the welding station, different from each other and from such characteristics of the welding circuit as occur during the normal welding operation.

Other objects of our invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
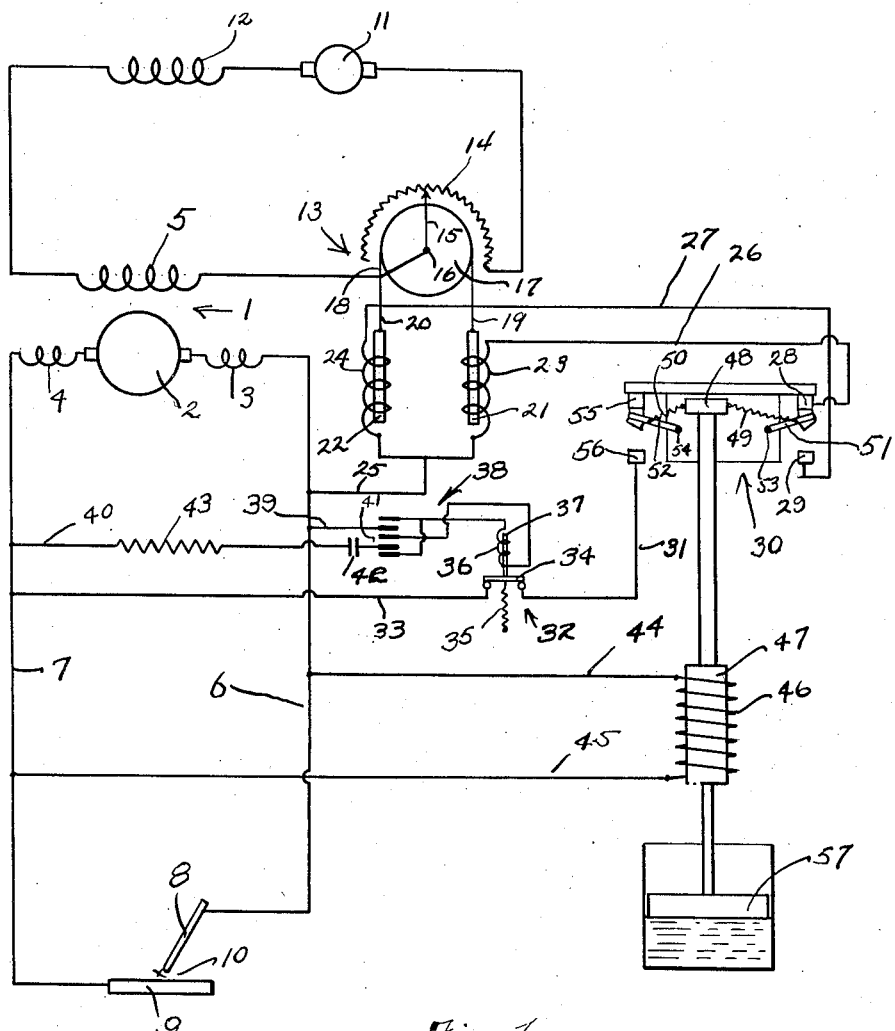
Figure 2:
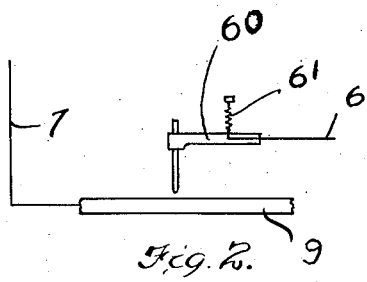

In said annexed drawing:

Fig. 1 is a schematic diagram of an arc welding system having a control circuit arranged in accordance with our invention associated therewith; and Fig. 2 is a diagrammatic representation of a portion of the circuit illustrated in Fig. 1 showing particular variations in the means whereby the operator may set up the control currents for varying the output of the generator.

Referring now more particularly to the drawing and more especially to Fig. 1, the welding current generator, generally indicated at 1, comprises an armature 2, series field winding 3, an interpole winding 4, and an exciting winding 5. The armature 2 and windings 3 and 4 are connected in series with the welding circuit which comprises leads 6 and 7 which are respectively connected to a welding electrode 8 and the work 9. An arc 10 is maintained between the electrode 8 and the work.

The exciting winding 5 is connected to some suitable source of constant potential such as an exciter generally indicated at 11 and the exciter circuit may include a series field winding 12 for the exciter 11. The exciter 11 will preferably be driven by some suitable constant speed prime mover, such as an electric motor, which may be the same motor driving the armature 2 of the generator 1. The exciting winding 5 has a variable rheostat generally indicated at 13 connected in series therewith, which rheostat comprises a resistance unit 14 and a rheostat arm 15. The arm 15 is connected to a shaft 16 to which there is likewise connected a pulley or sheave 17. Trained about the pulley or sheave 17 is a cable 18, the opposite ends 19 and 20 of which are secured to armatures 21 and 22 respectively. The armatures 21 and 22 have respectively associated therewith solenoid windings 23 and 24; such windings being connected together at one end and to one side of the welding circuit, i. e., lead 6, by means of lead 25.

The opposite ends of the windings 23 and 24 are respectively connected by means of leads 26 and 27 to contact blocks 28 and 29. The circuit through either windings 23 or 24 is closed by means of a switch, generally indicated at 30, from lead 31 through a switch, generally indicated at 32, and lead 33, which is connected to the opposite side of the welding circuit, i. e., lead 7.

The switch, generally indicated at 32, comprises a contact bar 34 normally maintained in closed position under the influence of spring 35. The contact bar 34 is moved to the opened position by energization of the solenoid winding 36 which moves the armature 37 connected to the bar 34 upwardly. The special type of relay, generally indicated at 38, and connected across the welder circuit leads 6 and 7 by means of leads 39 and 40, respectively is utilized to control the energization of the winding 36. The relay 38 comprises a rectifier unit 41 which may conveniently be of the well-known copper oxide film type, a condenser 42 and a resistance unit 43.

In connection with the operation of the relay 38, it should be noted that in a direct current arc welding system the current flow during the operation of the arc is not true non-pulsating, unidirectional current, but instead, due to various conditions which exist in the arc, such as periodic bridging of the arc space by either a metallic vapor stream or by particles of molten metal, the volt-ampere characteristics of the arc circuit as shown by an oscillograph diagram is of a decided pulsating nature. It is due to the pulsating nature of the welding current voltage which permits the flow of current through the condenser 42 and the solenoid 36 during the normal arc welding operation. During the maintenance of the welding arc, therefore, the current will flow through the winding 36 causing the solenoid 37 associated therewith to be lifted upwardly, causing the switch 32 to be opened and the control circuit through the windings 23 and 24 to be deenergized. Fluctuations or other changes in the volt-ampere characteristics of the welding circuit during the normal welding operation will, therefore, have no effect on the setting of the rheostat 13.

Connected across the welder circuit leads 6 and 7 by means of leads 44 and 45 respectively is a solenoid winding 46 which has an armature 47 associated therewith. The upper end of the armature 47, i. e., the head 48, is connected by means of springs 49 and 50 to toggle link switch members 51 and 52 respectively. The links 51 and 52 are pivotally supported as at 53 and 54, such positions of support being arranged relatively to the axis of the solenoid armature 47, so that when the armature descends due to deenergization of the winding 46, the toggle link 52 will first be moved downwardly out of contact with block 55 and into contact with block 56 before the link 51 is moved downwardly out of contact with block 28 and into contact with block 29. The parts just described will preferably be so arranged relatively to each other that when the dash-pot head 57 has moved downwardly for half its possible distance, the contact arm 52 will have been moved into engagement with the block 56 while the arm 51 remains in contact with block 28. If, however, the head 57 of the dash-pot is moved downwardly for the full distance, the arm 52 will be in contact with the block 56 and the arm 51 will be moved downwardly into contact with the block 29.

The operation whereby the operator at the welding station may selectively move the rheostat arm 15 in either direction may be briefly explained as follows:—Assuming that the operator desires to move the rheostat arm 15 in a clockwise direction, the operator will hold the electrode 8 onto the work 9 without drawing the arc 10. This short-circuit of the welding leads 6 and 7 will first of all result in the flow in the welding circuit of a true non-pulsating, unidirectional current. Due to the flow of such non-pulsating unidirectional current, the solenoid winding 36 will be deenergized due to the condenser 42 being connected in series therewith so that the switch 32 will be moved to its closed position by means of the spring 35. Short-circuiting of the welding leads will, as previously explained, cause a deenergization of the solenoid 46 so that the armature 47 may descend and move the bar 52 into engagement with the contact 56. In the apparatus which has been constructed in accordance with this invention, the dash-pot 57 has been so proportioned with respect to the weight of the armature 47 that if the operator holds the electrode 8 onto the work 9 for a period of ten seconds, the armature 47 will have descended for a distance sufficient to close the arm 52 to the contact 56 and if the electrode is held onto the work for a period of approximately twenty seconds, the armature 47 will have had an opportunity to descend for a distance sufficient so that the bar 51 is moved into engagement with the contact block 29.

If the operator, therefore, holds the electrode onto the work, thereby short-circuiting the welding circuit for a period of ten seconds, and then moves the electrode out of engagement with the work, the circuit from lead 33 through switch 34, lead 31, contact block 56, arm 52, arm 51, contact block 28, lead 26, winding 23, lead 25, will be completed, causing the winding 23 to move the armature 21 downwardly causing a clockwise rotation of the arm 15 for one increment of movement. If the operator will then again hold the electrode onto the work for a period of ten seconds, the circuit through the winding 23 will be again completed, causing the arm 15 to be moved in a clockwise direction for another increment of movement.

If the operator should, however, hold the electrode onto the work for a period of twenty seconds, the armature 47 would settle for a distance to cause the circuit to be completed through the winding 24 in the following manner, viz:—The lead 33, switch 34, lead 31, contact block 56, arm 52, arm 51, contact block 29, lead 27, winding 24, and lead 25.

While the operator holds the electrode onto the work for twenty seconds, i. e., shorts the welding circuit for such interval, it will be noted that the armature 47, in descending, will send an impulse of current through the winding 23 before the bar 51 moves downwardly into engagement with the contact block 29, so that the rheostat arm 15 will be moved in a clockwise direction by one increment of movement. For this reason, the winding 24 and its associated armature 22 will be so proportioned that the distance of movement for each energization will be twice that of the movement of armature 21 for each energization of the winding 23. The action of the rheostat arm 15 for each twenty second, short-circuited period of the welding circuit is, therefore, first, a clockwise movement to the right for a short increment and then a counterclockwise movement to the left for twice such short increment so that finally the rheostat arm 15 will have been moved for one short increment of movement in a counterclockwise direction.

Instead of short-circuiting the welding circuit by holding the electrode 8 in engagement with the work 9, it may be possible to provide the electrode holder 60 with a resistance block, generally indicated at 61, which may be in the form of a carbon block extending out of the holder, and in electrical communication with the lead 6.

The operator, when he wishes to effect an adjustment of the rheostat 13 will, therefore, turn the electrode holder 60 over and bring the resistance block 61 in engagement with the work, thus short-circuiting the leads 6 and 7, causing a flow of non-pulsating direct current through such circuit to deenergize the winding 36 and also sufficiently short-circuiting the winding 46 so as to permit the armature 47 to descend. The resistance of the block 61 may, of course, be different and perhaps greater than the resistance of the electrode 8, so that when this expedient is employed, a somewhat different strength winding 46 may be utilized in order to secure the proper results.

In the light of the foregoing, it will be apparent that we have provided a control device for an arc welding system, whereby the operator may control the setting of the rheostat on the generator which governs the output thereof by a mere manipulation of the electrode or associated means at the welding station. Furthermore, such control system is characterized by the fact that the means for effecting a setting of the rheostat in no way interferes with the normal welding operation, nor do the usual changes in the characteristics of the welding circuit which occur during the normal welding operation have any effect upon the setting of the welding current generator control rheostat.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. A welding system comprising a supply station including a generator, a station remote from said supply station, a conductor extending from said supply station to said second station, means for varying the output characteristics of said generator, said last-named means including a relay at said supply station effective to thus vary the output characteristics of the generator in response to flow for significantly different intervals of time of control currents in said conductor significantly different from the welding current.

2. A welding system comprising a supply station including a welding generator, a welding station remote from said supply station, a conductor extending from said supply station to said welding station, means at said supply station for varying the operating characteristics of said generator, a control circuit for said generator regulating means, a relay functionally responsive to pulsations in current flow through an arc in said conductor for de-energizing and energizing said control circuit and a second relay in said control circuit functionally responsive to current flow in said control circuit for a predetermined length of time to energize said generator regulating means.

3. A welding system comprising a supply station including a welding generator, a welding station remote from said supply station, a welding circuit including a conductor extending from said supply station to said welding station, means at said supply station for varying the volt-ampere characteristic of the generator in opposite senses selectively responsive to current flow in the welding circuit for different intervals of time, and a relay functionally responsive to different types of current flow in the welding circuit for de-energizing and energizing said generator regulating means.

4. The combination with an electric arc welding current generator and an external arcing circuit, of means for varying the output of said generator by adjustments significantly different from each other, said means being selectively responsive to a short-circuiting of the arcing circuit for different periods of time, each longer than any occurring during the normal welding operation.

5. The combination with an electric arc welding current generator and an external arcing circuit, of means for varying the output of said generator in opposite senses, said means being selectively responsive to a short-circuiting of the arcing circuit for different periods of time, each longer than any occurring during the normal welding operation.

GEORGE G. LANDIS.
NORMAN J. HOENIE.